US012454835B2

(12) United States Patent
Gamble et al.

(10) Patent No.: US 12,454,835 B2
(45) Date of Patent: Oct. 28, 2025

(54) RAISED FLOOR POWER SKID (RFPS) WITH ENCLOSING ELEMENTS

(71) Applicant: VERTIV CORPORATION, Westerville, OH (US)

(72) Inventors: Brian Gamble, Wellington, OH (US); Jason DesJardins, Delaware, OH (US); Carl Krueger, Wakeman, OH (US); Jeffrey J. Grau, Bella Vista, AR (US)

(73) Assignee: VERTIV CORPORATION, Westerville, OH (US)

( * ) Notice: Subject to any disclaimer, the term of this patent is extended or adjusted under 35 U.S.C. 154(b) by 292 days.

(21) Appl. No.: 18/125,360

(22) Filed: Mar. 23, 2023

(65) Prior Publication Data

US 2023/0323676 A1 Oct. 12, 2023

Related U.S. Application Data

(60) Provisional application No. 63/329,075, filed on Apr. 8, 2022.

(51) Int. Cl.
*E04F 15/024* (2006.01)
*H02G 3/38* (2006.01)

(52) U.S. Cl.
CPC ........... *E04F 15/024* (2013.01); *H02G 3/385* (2013.01)

(58) Field of Classification Search
CPC ..... E04F 15/024; H02G 3/385; H05K 7/1492; H05K 7/497; H05K 7/1485; H05K 7/20124; H05K 7/20136; H05K 7/20145
See application file for complete search history.

(56) References Cited

U.S. PATENT DOCUMENTS

| 5,345,779 A * | 9/1994 | Feeney | H02G 3/285 52/79.9 |
| 5,467,609 A * | 11/1995 | Feeney | H02G 3/285 52/220.2 |
| 6,202,374 B1 * | 3/2001 | Cooper | H02G 3/285 52/220.8 |
| 8,681,479 B2 | 3/2014 | Englert et al. | |
| 9,192,069 B2 | 11/2015 | Emert et al. | |
| 9,219,384 B2 | 12/2015 | Emert et al. | |
| 9,337,688 B2 | 5/2016 | Englert et al. | |
| 9,398,717 B2 | 7/2016 | Englert et al. | |
| 9,431,798 B2 | 8/2016 | Englert et al. | |
| 9,480,176 B2 | 10/2016 | Englert et al. | |
| 9,865,998 B1 | 1/2018 | Emert et al. | |
| 10,568,231 B1 | 2/2020 | Metcalf | |
| 2011/0023388 A1 * | 2/2011 | Tong | E04H 5/02 52/173.1 |
| 2013/0293017 A1 * | 11/2013 | Englert | H02J 9/04 307/65 |
| 2014/0099873 A1 | 4/2014 | Ruiz et al. | |

OTHER PUBLICATIONS

Extended European Search Report dated Sep. 8, 2023; European Application No. 23166583.7.

* cited by examiner

*Primary Examiner* — Jessica L Laux
(74) *Attorney, Agent, or Firm* — Suiter Swantz IP

(57) ABSTRACT

A power distribution system is disclosed. The power distribution system may include a power skid configured to be installed in a raised floor configuration. The power skid may include a support structure, a floor coupled to the support structure and located on top of the support structure, and one or more enclosing elements disposed along a boundary of the power skid and coupled to the support structure.

13 Claims, 8 Drawing Sheets

RAISED FLOOR POWER SKID (RFPS) WITH ENCLOSING ELEMENTS

CROSS-REFERENCE TO RELATED APPLICATION

The present application claims the benefit under 35 U.S.C. § 119(e) of U.S. Provisional Application Ser. No. 63/329,075, filed Apr. 8, 2022, entitled RAISED FLOOR POWER SKID WITH ENCLOSING ELEMENTS, naming Brian Gamble, Jason DesJardins, Carl Krueger, and Jeffrey D. Grau, as inventors, which is incorporated herein by reference in the entirety.

TECHNICAL FIELD

The present disclosure generally related to the field of power distribution systems, and, more particularly, to raised floor power skids.

BACKGROUND

Power skids may be used in a variety of applications. For example, power skids may include backup power equipment and be configured to provide power distribution to data centers. Conventional power skids may present a number of challenges to cool equipment mounted on the power skid, connect the equipment, and maintain work clearance space between the pieces of equipment on the power skid.

SUMMARY

A power distribution system is disclosed in accordance with one or more illustrative embodiments of the present disclosure. In one illustrative embodiment, the power distribution system may include a power skid configured to be installed in a raised floor configuration. In another illustrative embodiment, the power skid may include a support structure. In another illustrative embodiment, the power skid may include a floor coupled to the support structure and located on top of the support structure. In another illustrative embodiment, the power skid may include one or more enclosing elements disposed along a boundary of the power skid and coupled to the support structure.

In another illustrative embodiment, the one or more enclosing elements may be configured to at least partially enclose and define a volume within the power skid.

In another illustrative embodiment, the one or more enclosing elements may comprise one or more side walls.

In another illustrative embodiment, the power skid may be configured to integrate with an existing raised floor cooling configuration when the power skid is installed.

In another illustrative embodiment, the power skid may further comprise an opening configured to allow cool air through the opening and above the floor.

In another illustrative embodiment, the power distribution system may further comprise one or more equipment.

In another illustrative embodiment, the power skid may be configured to provide direct convective air cooling to the one or more equipment.

In another illustrative embodiment, the opening may comprise one or more deflecting surfaces.

In another illustrative embodiment, the one or more deflecting surfaces may comprise one or more air hoses configured to direct the air to the one or more equipment.

In another illustrative embodiment, the opening may comprise an active air flow regulator.

In another illustrative embodiment, a front face of at least some of the one or more equipment may face outwards towards a boundary of the power skid.

In another illustrative embodiment, the power skid may further comprise one or more trays below the floor and coupled to the support structure.

In another illustrative embodiment, the trays may be supported by threaded rods.

In another illustrative embodiment, the power skid may further comprise one or more cables configured to be supported by the one or more trays and transfer power.

In another illustrative embodiment, the one or more cables may be standard type electrical power cables.

In another illustrative embodiment, the power skid may further comprise shared corridor space for switchgear equipment.

In another illustrative embodiment, the power skid may be configured for unobstructed access below the floor. In another illustrative embodiment, at least one of the one or more enclosing elements may be configured to be removably coupled to the power skid to allow for the unobstructed access below the floor.

It is to be understood that both the foregoing general description and the following detailed description are exemplary and explanatory only and are not necessarily restrictive of the invention as claimed. Also, it is to be understood that the phraseology and terminology used herein is for the purpose of description and should not be regarded as limiting. The accompanying drawings, which are incorporated in and constitute a part of the specification, illustrate embodiments of the invention, and, together with the general description, serve to explain the principles of the invention.

BRIEF DESCRIPTION OF THE DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings.

Power skids, in general, include a floor constructed to support equipment, such as electrical power distribution and/or back-up power equipment for data centers. Power skids may be modular and installed in the whitespace of a data center, such as in raised floor whitespace using Raised Floor Power Skids (RFPSs).

Conventional power skids have either a minimal floor structure where the floor of the power skid is placed directly on the ground or a raised floor power skid structure with an open design without side-walls, having a supporting structural frame that allows air movement both under the power skid and up through the power skid to cool equipment.

Installing a power skid in an existing or newly constructed data center that has a raised floor has a unique set of challenges. It is contemplated herein that these challenges may include how to cool the equipment mounted on the power skid, how to cable the equipment, and how to place equipment in a serviceability line-up that maintains National Electrical Code (NEC) required work clearances.

Accordingly, the present disclosure is directed to a raised floor power skid with an enclosed design that addresses at least some of these challenges. For example, the power skid may be configured to enclose (e.g., at least partially enclose) a volume with side walls so that cool air travelling below a raised floor whitespace is blocked from entering below the power skid floor and is deflected upward to efficiently cool the equipment above the power skid. Moreover, the present disclosure is directed to a RFPS that simplifies and improves how equipment is cooled, installed, and serviced. In some embodiments, the present disclosure fills a desire for power skids configured to be installed in specific, existing whitespace. Such existing whitespace may require particular design constraints and requirements. Benefits of such a power skid may include lower installation costs and longer-term operational efficiencies.

FIGS. 1-5 illustrate an example of a power skid 102 in a raised floor configuration with one or more enclosing elements 106 (e.g., side walls).

Figure 1:
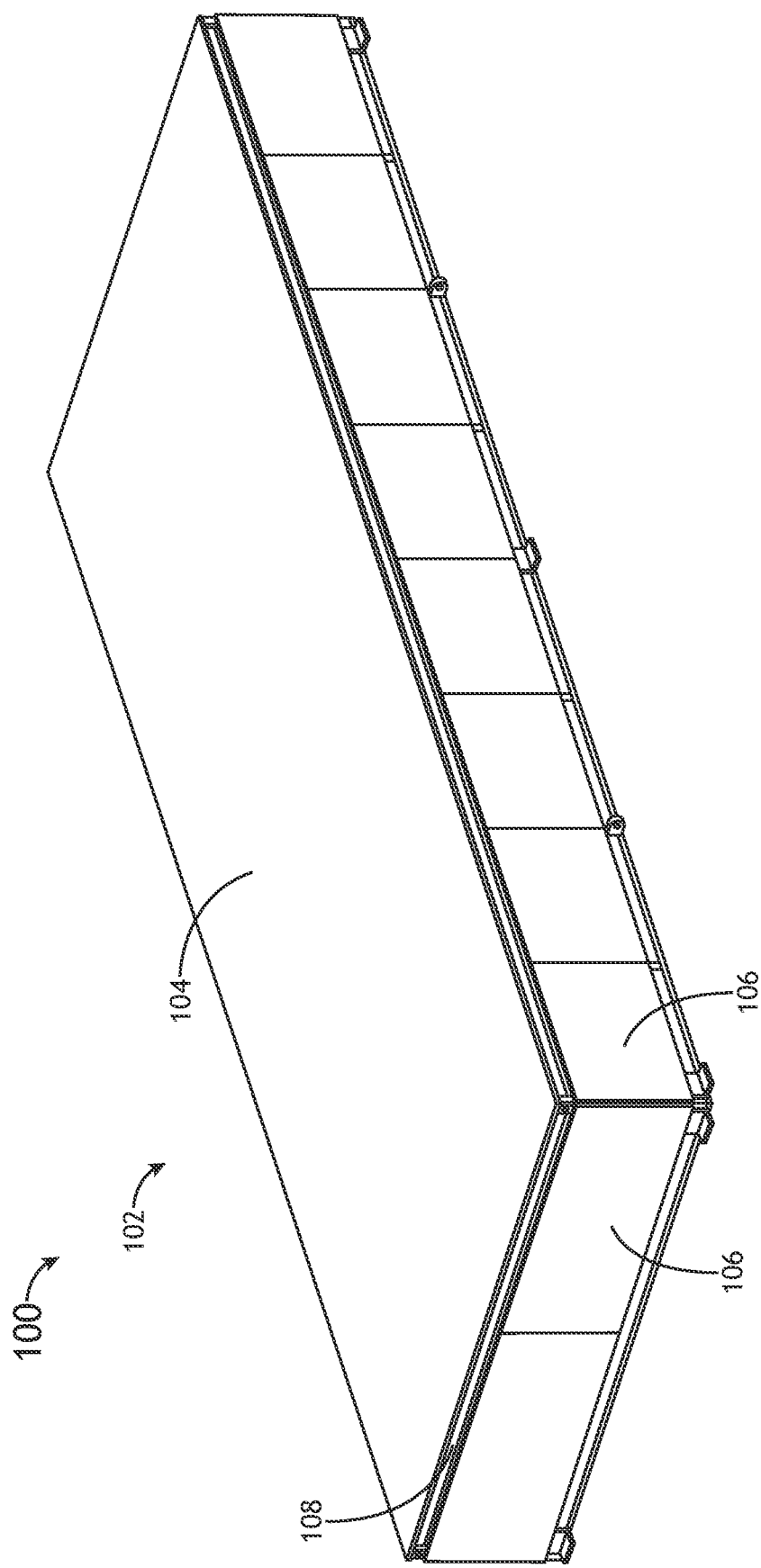
FIG. 1 is a power distribution system including a power skid with enclosing elements, in accordance with one or more embodiments of the present disclosure.

FIG. 1 is a power distribution system 100 including a power skid 102 with enclosing elements 106, in accordance with one or more embodiments of the present disclosure. The enclosing elements 106 are configured to enclose (e.g., fully enclose, partially enclose, and the like) a volume below a floor 104 of the power skid 102. For example, the enclosing elements 106 may at least partially enclose the volume, such as substantially enclosing (e.g., 90% enclosed or more, 95% enclosed or more, 99% enclosed or more, and the like). In this regard, relatively small gaps and the like may exist, but generally, the enclosing elements 106 may deflect cool air currents from entering inside the power skid 102. Benefits include more efficiently cooling the equipment above the power skid 102 and not needing to use more expensive and less flexible plenum rated cabling rated for lower temperatures.

The enclosing elements 106 may, as shown, be disposed along a boundary 108 (e.g., rectangular boundary) and coupled to the support structure (e.g., support structure 306 of FIG. 3) of the power skid 102.

The power skid 102 includes a floor 104 on top of the support structure 306 (see FIG. 3) and coupled to the support structure 306. For example, the floor 104 may be a flat sheet (or multiple flat sheets) of a material (e.g., sheet steel) and may provide structural support for equipment. For example, the floor 104 may be 0.25 inch thick. The floor 104 may be thermally conductive (e.g., metal or other material with high thermal conductivity) and thermally coupled to equipment mounted on the power skid 102 to aid in dissipating heat.

As noted, the power skid may include one or more enclosing elements 106 (e.g., side enclosures, side walls, and the like). For example, the side walls 106 may be multiple flat sheets of a material. For instance, the side walls 106 may be 1/16 inch thick and may be steel sheets. The side walls 106 may at least partially enclose a volume of air which can be a space for equipment cables. The side walls 106 may line up with vertical supports for ease of coupling (e.g., coupling via mechanical fasteners and/or welding).

Figure 3:
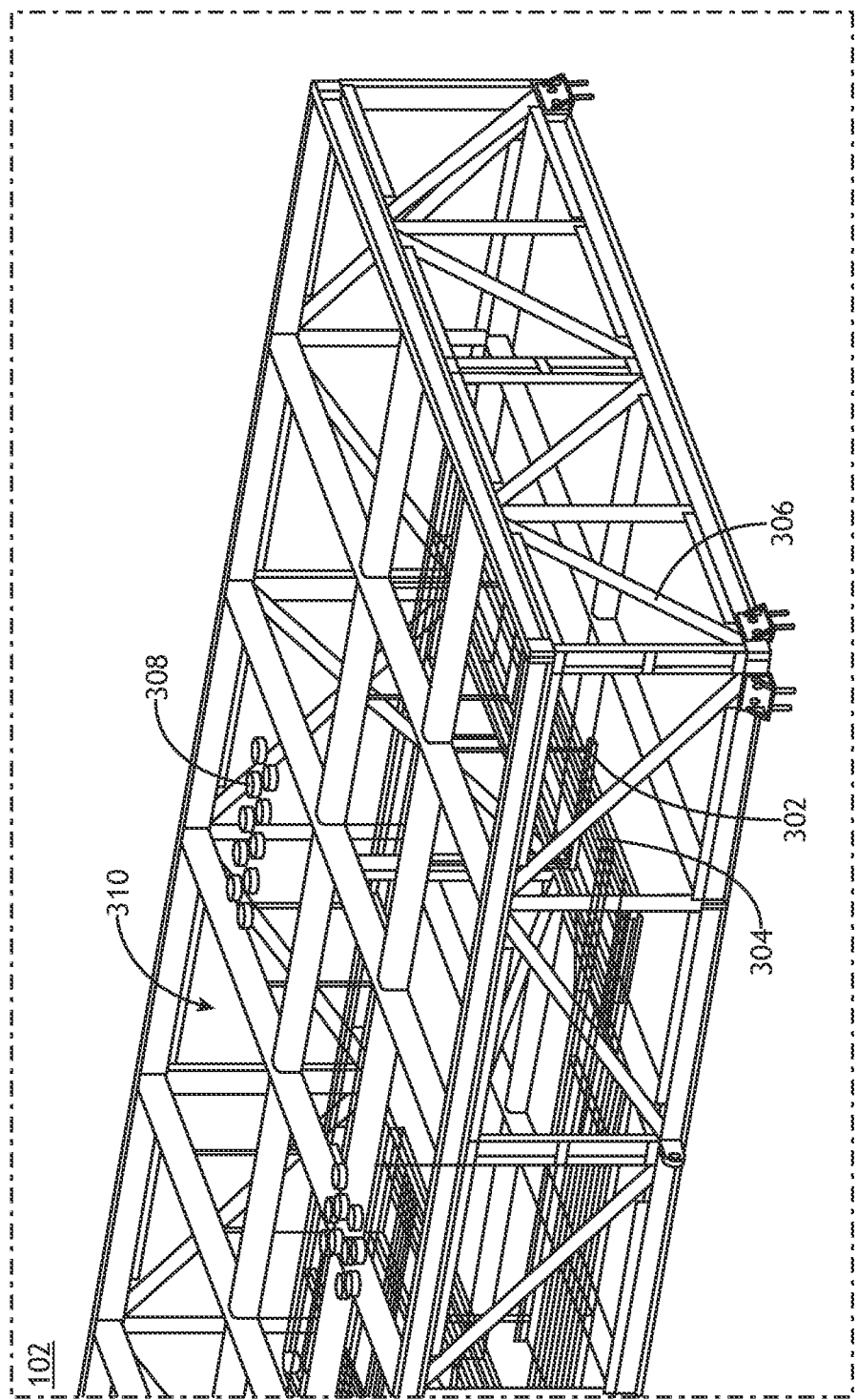
FIG. 3 is an inside view of a volume of the power skid with the floor and enclosing elements hidden to illustrate trays and cables, in accordance with one or more embodiments of the present disclosure.

The power skid 102 may be configured to allow for clear, unobstructed access under the power skid floor 104 (i.e., access to components in the volume 310 shown in FIG. 3). At least one of the enclosing elements 106 may be removably coupled to the power skid 102 for egress under the power skid floor 104. For example, the power skid 102 may be configured to allow for removably coupled (e.g., hinged) panels (e.g., side panels 106, floor panels (not shown)) for access, maintenance, and the like under the power skid floor 104. In this way, the power skid 102 may be configured to comply with NEC working space clearance requirements for user access.

It is noted that the specific thicknesses, relative sizes, materials, and the like shown in FIG. 1 are provided for illustrative purposes only and those skilled in the art should recognize that a variety of dimensions, materials, and the like may be suitable for implementation in the present disclosure and may vary as needed. For example, the side walls 106 shown in FIG. 1 may all be the same size or different sizes and may be larger and/or smaller, and there may be more than one side wall in the vertical direction.

Figure 2:
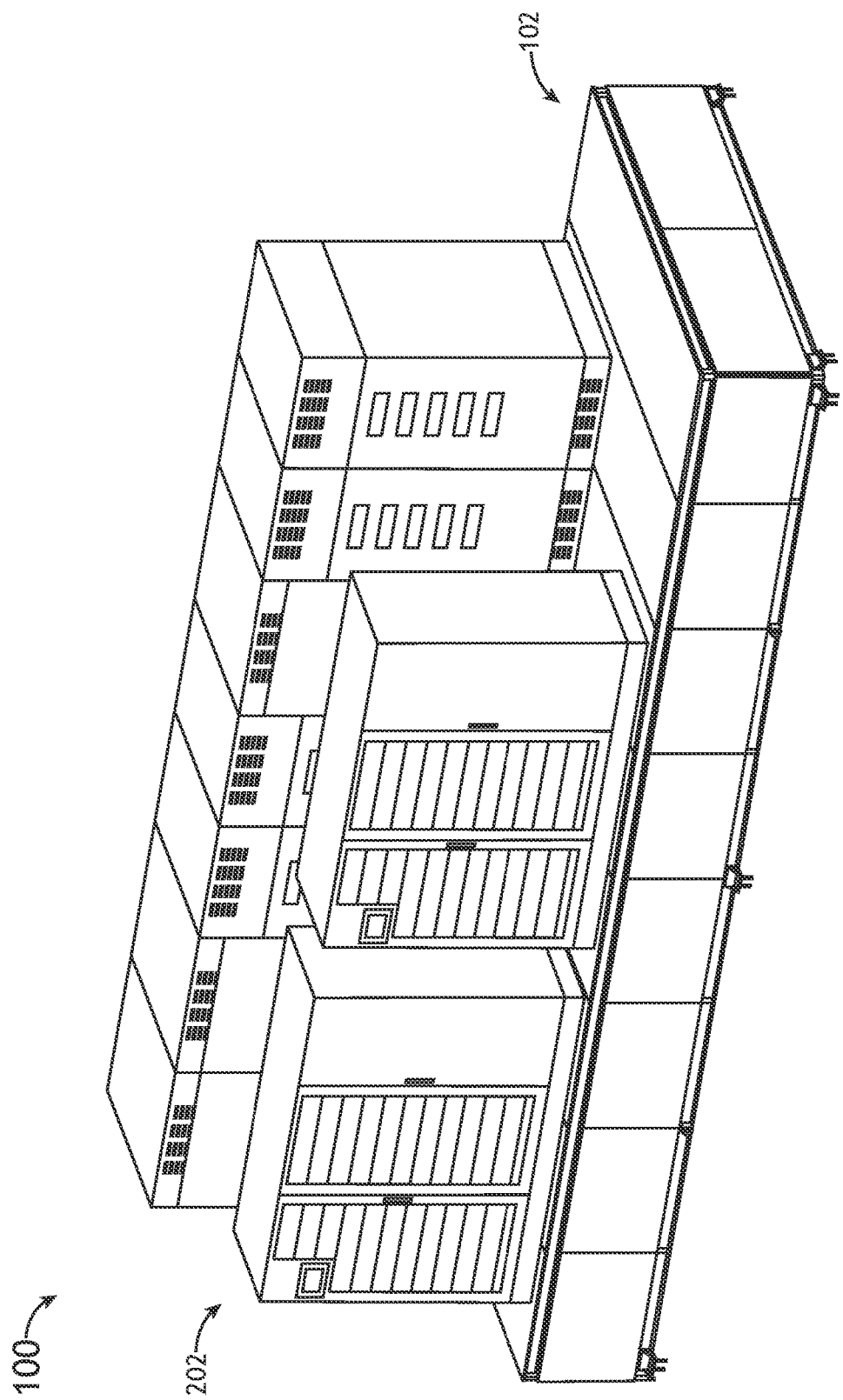
FIG. 2 is the power distribution system including equipment installed on the power skid, in accordance with one or more embodiments of the present disclosure.

FIG. 2 is the power distribution system 104 including equipment 202 installed on the power skid 102, in accordance with one or more embodiments of the present disclosure.

In embodiments, the power skid 102 may be configured such that at least some of the equipment 202 is facing outwards. For example, the equipment 202 may be conveniently accessible by a user standing just outside the power skid 102. Such a configuration may allow for efficient cooling by cool air being directed to the equipment 202 that is facing outwards.

FIG. 3 is an inside view of a volume 310 of the power skid 102 with the floor 104 and enclosing elements 106 hidden from view to illustrate trays 302 and cables 304 below the floor 104, in accordance with one or more embodiments of the present disclosure. The trays 302 are configured to support the cables 304. For example, power cables 304 may run to and from the power skid 102 and may be placed in the trays 302 underneath the power skid floor 104.

The power skid 102 includes support structure 306, such as metal cross links and the like in a raised floor configuration such that the floor 104 is configured to be used in a raised floor environment.

In some embodiments, the power skid 102 includes cable openings 308, such as holes cut into the floor 104. The cable openings 308 allow for cables 304 to be coupled (e.g., electrically and physically coupled) to the equipment 202. For example, the cable openings 308 may be aligned to be inside a footprint of the equipment 202.

Benefits of the present disclosure may include a power skid 102 configured to integrate with existing (e.g., specific) raised floor configurations and a corresponding cooling methodology of those raised floor configurations—while helping to mitigate a variety of challenges in doing so.

For example, the power skid 102 may be configured to integrate with an existing raised floor cooling configuration, such as via openings and/or ducts configured to direct air that is below the raised floor above the raised floor and towards the equipment 202. The power skid 102 may simplify power skid deployment (e.g., whitespace power skid installation) by being compatible with existing cooling configurations of a data center. For instance, users may be able to apply cooling to a power skid 102 and mounted equipment 202 on the power skid 102 due to integration with an existing cooling configuration, thereby reducing cost, speeding up design/installation, improving efficiency, and/or improving cooling performance. The power skid 102 may prevent the cooled air from inefficiently cooling the cables 304 and portions (e.g., trays 302) of the power skid 102 adjacent to the cables 304.

The power skid 102 may allow for improved overall air management and may perform and function like an air deflector (e.g., directing air to the equipment 202 on the power skid 102 and treating the equipment 202 as a zone to be directly cooled). For example, the one or more enclosing elements 106 and the floor 104 may help direct cooled air to the equipment 202 The enclosing elements 106 and the floor 104 may prevent cool air from inefficiently flowing under the power skid floor 104, providing energy efficiency savings.

Due to less extreme temperatures, the power skid 102 may allow for use of standard type electrical power cables in lieu of plenum rated cables. For example, the power skid 102 may allow for standard Diesel Locomotive Cables (DLO) and not require thicker and better temperature-rated electrical power cables (e.g., plenum rated or Metal Clad (MC) cables) that are typically required in conventional power skids. This may save material costs, and also simplify installation as higher rated cables may not have a bend radius that accommodates the same footprint as standard type electrical power cables. Thus, labor may be significantly reduced in routing and forming the power cables between the equipment lineups on the power skid 102.

Figure 4:
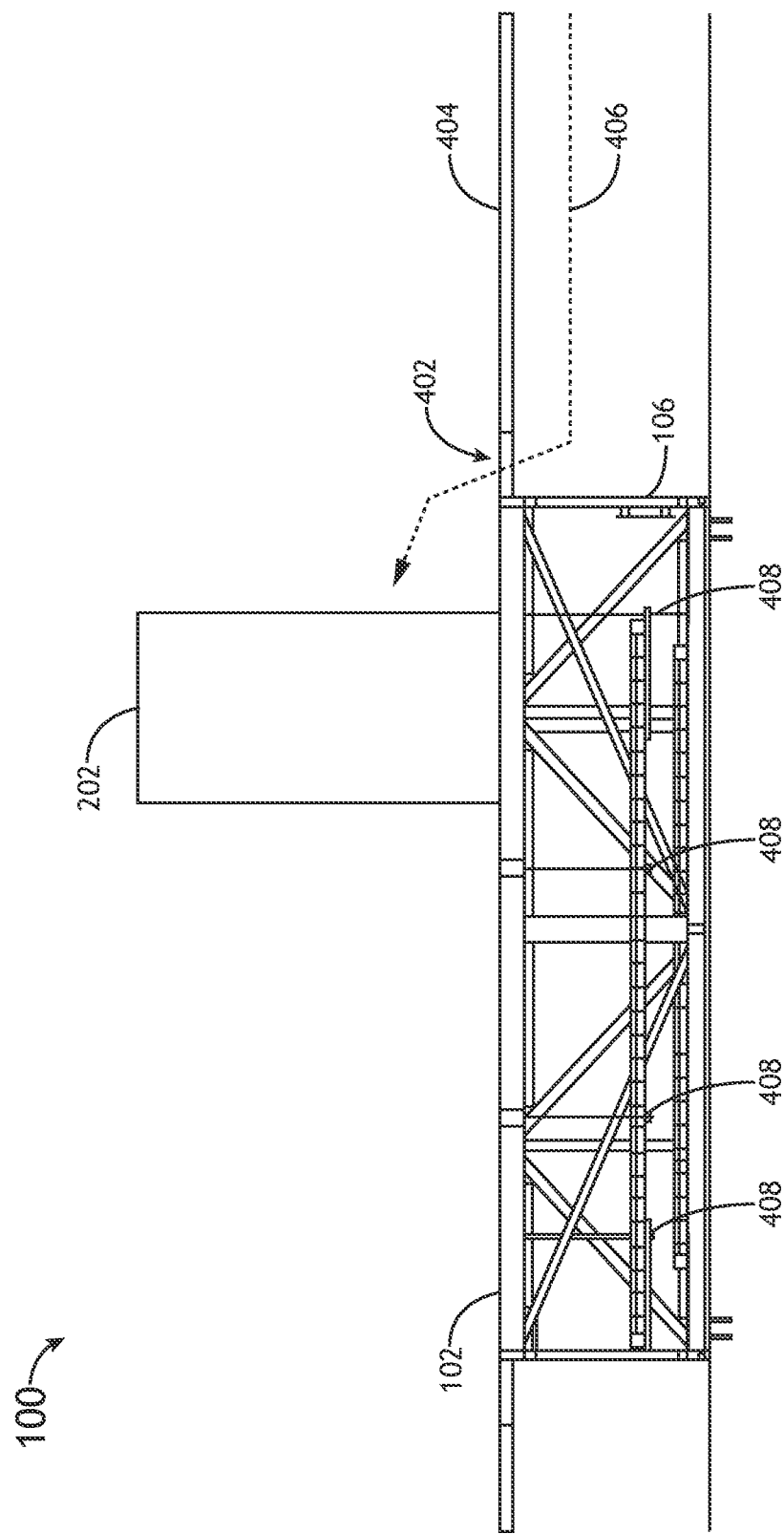
FIG. 4 is a cross sectional view along a width of the power distribution system illustrating air being blocked by the enclosing elements and being directed up to cool the equipment via an opening, in accordance with one or more embodiments of the present disclosure.

FIG. 4 is a cross sectional view along a width of the power distribution system 100 illustrating air 406 being blocked by the enclosing elements 106 and being directed up to cool the equipment 202 via an opening 402, in accordance with one or more embodiments of the present disclosure. In this regard, the power skid 102 may be configured to provide direct convective air cooling to the one or more equipment 202.

In some typical whitespace cooling configuration data centers, cool air may flow under the raised floors 404. In embodiments of the present disclosure, the addition of the enclosing elements 106 prevents the cool air 406 from inefficiently cooling the underside of the power skid floor 104. For example, the opening 402 may allow/direct the cool air 406 to raise above the floor 104 to cool equipment 202 as shown in FIG. 4.

The opening 402 may be any opening (e.g., one or more openings 402 along one or more sides of the power skid such as along all four boundaries 108). The cool air 406 may be directed to the equipment 202 through any method or element. For example, the opening 402 may be proximate to the edge of the power skid 102 and defined by the adjacent raised floor 404 of the whitespace and/or defined by the power skid 102. For example, the opening 402 may be built into the adjacent floor 404 and/or built into (e.g., designed) as part of the power skid 102. The opening 402 may be any shape (e.g., large opening, slots, holes/perforations, and the like). The opening 402 may include deflecting surfaces (not shown) to direct the cool air 406 towards the equipment 202 (e.g., at an angle relative to the floor 104). The deflecting surfaces may be located above and/or below the floor 104. For instance, the deflecting surfaces may be enclosed ducts or surfaces of individual vents openings 402. By way of another example, enclosed ducts (e.g., air hoses, solid ducts, and the like) may be run from the opening 402 to the equipment 202 directly (e.g., to an equipment opening near the top of the equipment 202) to efficiently direct the air 406 to the equipment 202. The opening 402 may include (or be configured to work with) one or more active air flow regulators (not shown) (e.g., to regulate the amount of air 406). The air flow regulators (e.g., pump, fan, and the like) may actively force/push air 406 through the opening 402 and/or actively/passively constrain the amount of air 406 pushed through the opening (e.g., using dynamically adjustable vents, flaps, valves, and the like) and be located proximate to or far from the opening 402.

It is contemplated that such an opening 402 may allow for unobstructed corridor space (e.g., corridor space 804 of FIG. 8) between the equipment 202 (e.g., due to lack of cooling ducts in the corridor space). For example, an opening 402 proximate to the edge of the power skid 102 with the outer equipment 202 facing outwards may allow for the outer equipment 202 to be cooled without obstructing egress in the corridor between the equipment 202.

The power skid 102 may include tray support elements 408 configured to support the trays 302 that are supporting the cables 304.

Figure 5:
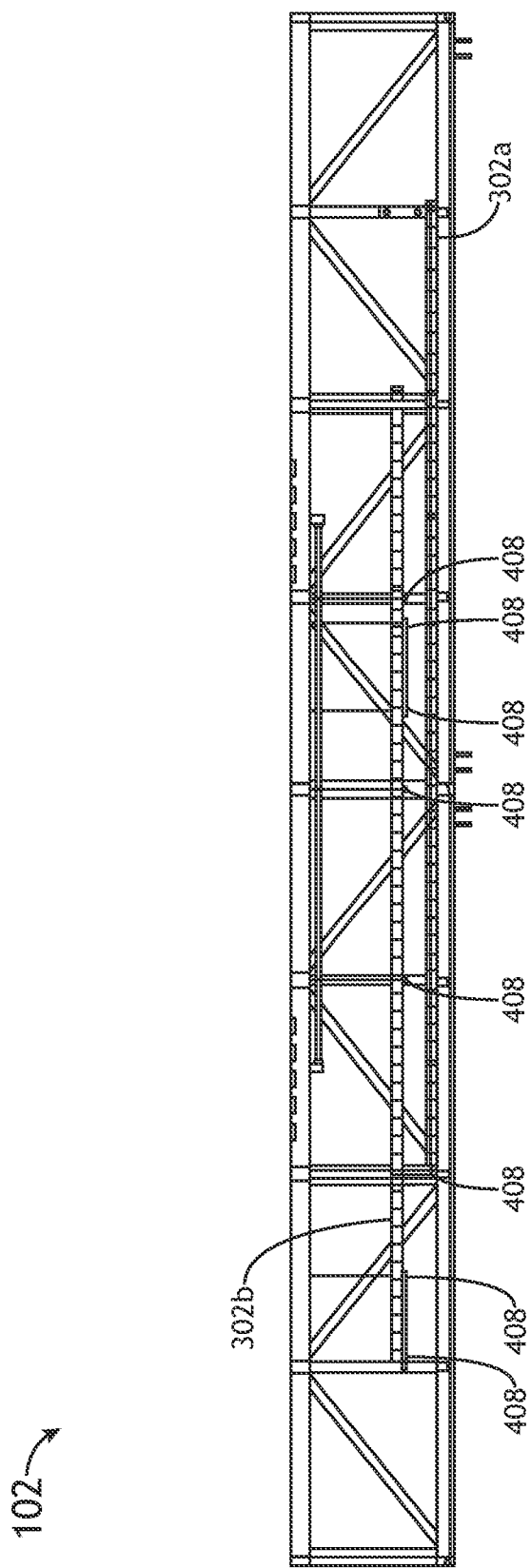
FIG. 5 is a cross sectional side view along a length of the power distribution system illustrating the trays, in accordance with one or more embodiments of the present disclosure.

FIG. 5 is a cross sectional side view along a length of the power distribution system 100 illustrating the trays 302 (e.g., first tray 302*a* and second tray 302*b*) and the tray support elements 408, in accordance with one or more embodiments of the present disclosure. The power skid 102 may include any number of trays 302 in any arrangement. For example, as shown, the power skid 102 may include a first tray 302*a* positioned lower than a second tray 302*b*.

In embodiments, the tray support elements 408 are any elements configured to support the trays 302, such as, but not necessarily limited to, threaded rods and channels coupled to cross beams and the like, which are vertically aligned and are also coupled to the trays 302.

Figure 6:
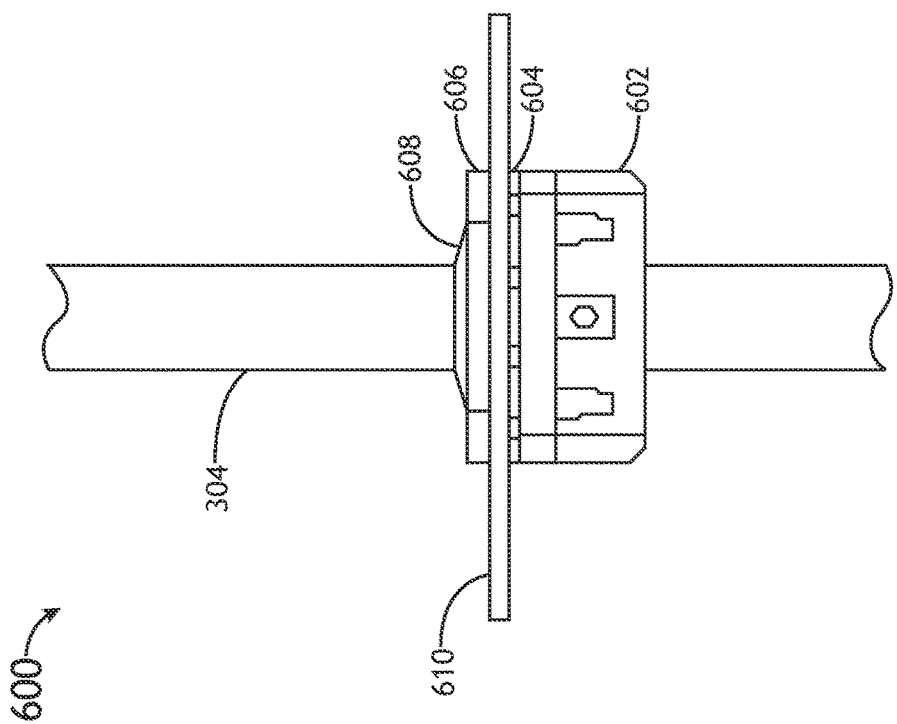
FIG. 6 is mounting system for a cable, in accordance with one or more embodiments of the present disclosure.

FIG. 6 is mounting system 600 for a cable 304, in accordance with one or more embodiments of the present disclosure. The mounting system 600 may include an insulated bushing 602 and a lock nut 604 on one side. On an opposite side of a mounted element 610 (e.g., bracket, plate with a hole for the cable 304, and the like), the mounting system 600 may include a chase nipple 606, and a duct seal 608.

Figure 7:
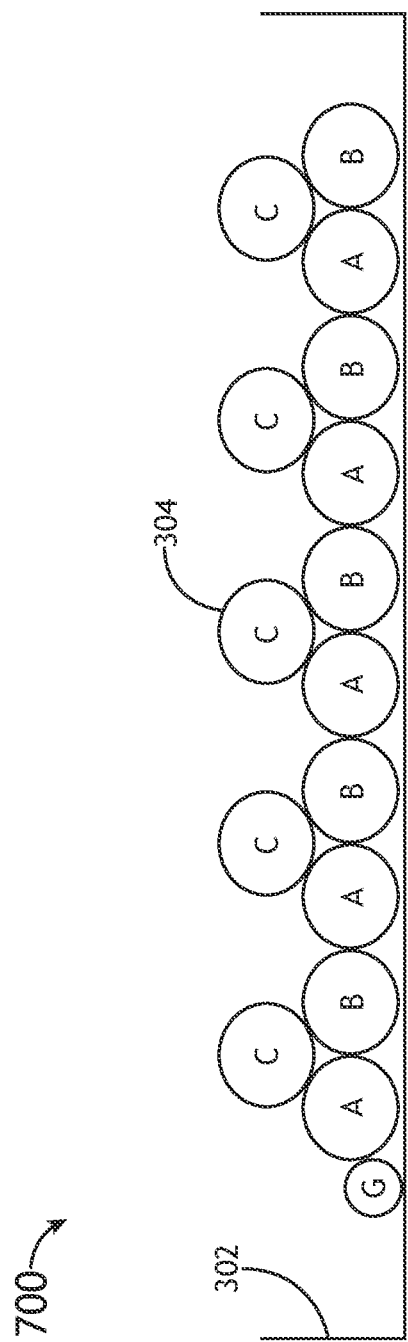
FIG. 7 is a cross sectional view of a cable tray layout, in accordance with one or more embodiments of the present disclosure.

FIG. 7 is a cross sectional view of a cable tray fill layout 700, in accordance with one or more embodiments of the present disclosure. As shown, the cables 304 may be supported and lay flat in a U-shaped tray 302.

Figure 8:
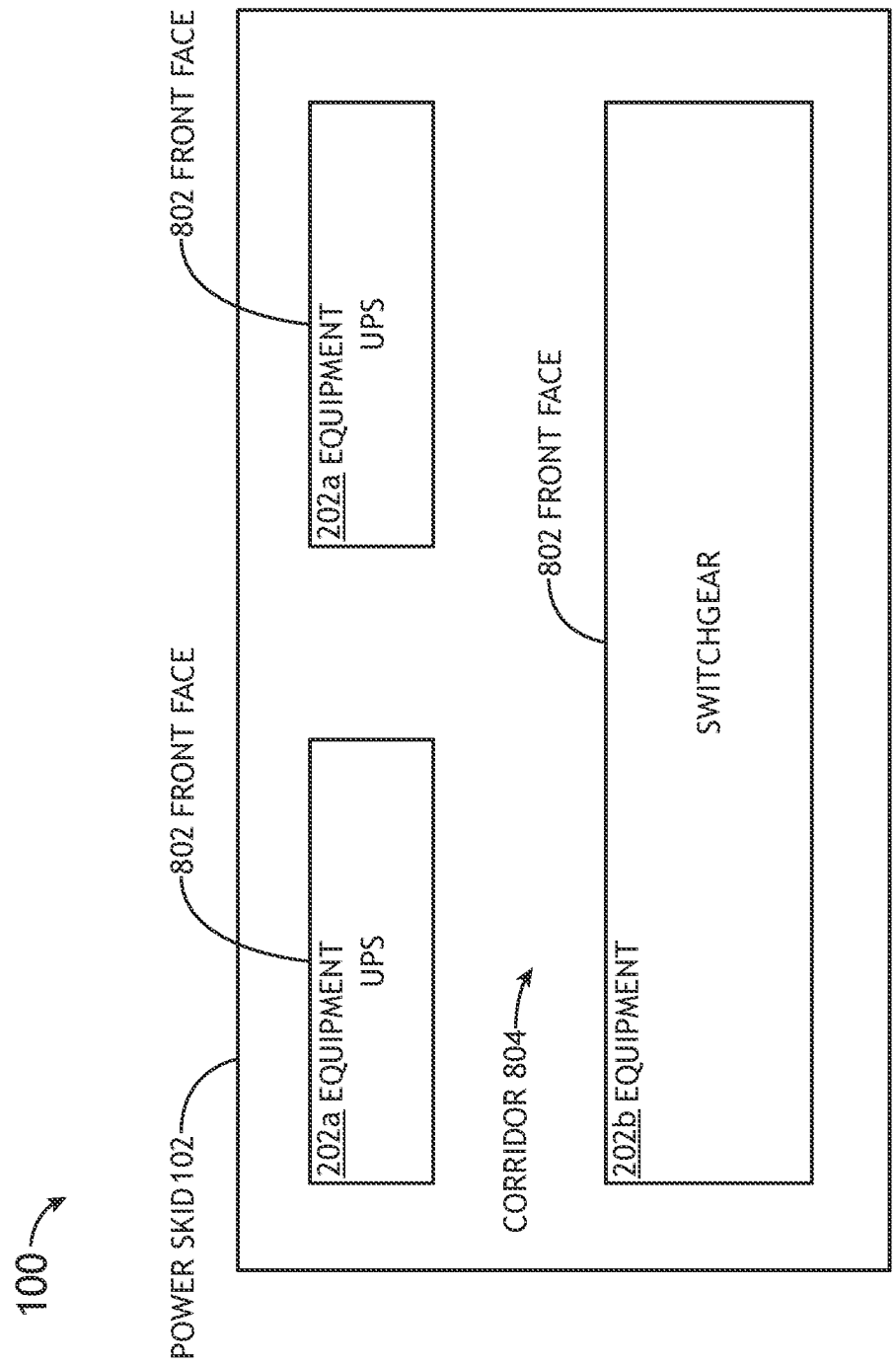
FIG. 8 is a layout of a power distribution system with a front face of equipment facing outwards, in accordance with one or more embodiments of the present disclosure.

FIG. 8 is a layout of a power distribution system 100 with at least some front faces 802 of equipment 202 facing outwards, in accordance with one or more embodiments of the present disclosure. For example, the power skid 102 may include equipment 202 (e.g., uninterruptible power supply (UPS) gear) configured to face outwards, which may improve cooling and servicing of the equipment 202.

For example, cable openings (e.g., holes) in the floor 104 of the power skid 102 may be located in a configuration such that equipment 202 installed will be facing outwards.

The power skid 102 may include shared corridor space 804 for switchgear equipment requirements on a single skid, which may also improve servicing of the equipment 202.

Referring back to FIGS. 1-5 and 8, the power skid 102 is discussed in more detail.

The power skid 102 and equipment 202 may be pre-wired (e.g., at the factory, before installation, and the like), which may save installation costs and shorten onsite installation time.

The power skid 102 may be configured to be installed (e.g., via field installation in a data center) so as to not impede nor obstruct underfloor circuits such as utility cables, generator cables, output circuits to the batteries, PDUs, power circuits, control cabling and/or the like. For example, the power skid may be configured to be placed as such (e.g., by design), such as outer size dimensions providing needed clearance.

The power skid 102 may be configured to be fabricated (welded, mechanically fastened, and the like) from metal, such as steel.

In a general sense, those skilled in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

We claim:

1. A power distribution system comprising:
   a power skid configured to be installed in a raised floor configuration, the power skid comprising:
   a support structure;
   a floor coupled to the support structure and located on top of the support structure; and
   two or more enclosing elements disposed along a boundary of the power skid and coupled to the support structure,
   the two or more enclosing elements configured to at least partially enclose and define a volume within the power skid,
   the two or more enclosing elements comprising two or more side walls on each side of the boundary,
   the two or more enclosing elements configured to prevent cool air from cooling an underside of any portion of the floor of the power skid.

2. The power distribution system of claim 1, the power skid configured to integrate with an existing raised floor cooling configuration when the power skid is installed.

3. The power distribution system of claim 1, the floor of the power skid further comprising an opening configured to allow the cool air through the opening and above the floor, the opening located proximate to an outer edge of the power skid.

4. The power distribution system of claim 3, the power distribution system further comprising one or more equipment.

5. The power distribution system of claim 4, the power skid configured to provide direct convective air cooling to the one or more equipment.

6. The power distribution system of claim 4, a front face of at least some of the one or more equipment facing outwards towards a boundary of the power skid.

7. The power distribution system of claim 1, the power skid further comprising one or more trays below the floor and coupled to the support structure.

8. The power distribution system of claim 7, the one or more trays supported by threaded rods.

9. The power distribution system of claim 7, the power skid further comprising one or more cables configured to be supported by the one or more trays and transfer power.

10. The power distribution system of claim 9, the one or more cables being standard type electrical power cables.

11. The power distribution system of claim 1, the power skid further comprising shared corridor space for switchgear equipment.

12. The power distribution system of claim 1, the power skid configured for unobstructed access below the floor.

13. The power distribution system of claim 12, at least one of the two or more enclosing elements configured to be removably coupled to the power skid to allow for the unobstructed access below the floor.

\* \* \* \* \*